(12) United States Patent
Alessi

(10) Patent No.: US 6,925,745 B1
(45) Date of Patent: Aug. 9, 2005

(54) COLLAPSIBLE BLIND

(76) Inventor: Kim Alessi, P.O. Box 770495, Steamboat Springs, CO (US) 80477

( * ) Notice: Subject to any disclaimer, the term of this patent is extended or adjusted under 35 U.S.C. 154(b) by 9 days.

(21) Appl. No.: 10/621,157

(22) Filed: Jul. 16, 2003

(51) Int. Cl.[7] .................. A01M 31/00; A01M 31/06
(52) U.S. Cl. ................ 43/1; 43/2; 135/901; D22/125
(58) Field of Search .................. 135/901; 428/12, 428/16, 919; 43/1, 2; 446/370, 373, 387; D22/125; 40/603

(56) References Cited

U.S. PATENT DOCUMENTS

| | | | |
|---|---|---|---|
| 3,052,054 A | | 9/1962 | Littleton et al. |
| 3,163,418 A | * | 12/1964 | Myers .................. 273/408 |
| 4,364,193 A | | 12/1982 | Visco |
| 4,650,701 A | * | 3/1987 | Jackson .................. 428/16 |
| 4,682,436 A | | 7/1987 | Ritson |
| 4,777,755 A | | 10/1988 | Colburn |
| 4,829,694 A | * | 5/1989 | Oasheim .................. 43/1 |
| 5,377,711 A | | 1/1995 | Mueller |
| D356,620 S | * | 3/1995 | Weber et al. .......... D22/125 |
| 5,400,541 A | | 3/1995 | Ennamorato et al. |
| 5,522,168 A | | 6/1996 | Friddle |
| 5,572,823 A | | 11/1996 | Savaria |
| 5,675,926 A | | 10/1997 | Manka |
| 5,791,081 A | * | 8/1998 | Turner et al. .............. 43/2 |
| 5,865,627 A | * | 2/1999 | Foresman ............... 434/193 |
| 5,943,807 A | | 8/1999 | McPherson |
| 6,296,005 B1 | | 10/2001 | Williams et al. |
| 6,431,192 B2 | * | 8/2002 | O'Hare ................. 135/125 |
| 2003/0145506 A1 | * | 8/2003 | Lorenz .................. 43/2 |

* cited by examiner

Primary Examiner—Robert Canfield
(74) Attorney, Agent, or Firm—Ramon L. Pizarro; Edwin H. Crabtree

(57) ABSTRACT

A blind or device for concealing the presence of a person, which include a flexible sheet of material, the sheet of material having a first side having an image of an animal such as a domesticated animal. The flexible sheet of material further having a perimeter, at least most of the perimeter being supported by a frame. The frame will be made from resilient sections that connect to one another and pull most of the flexible sheet of material taut. The blind may further include a handle mounted within the perimeter of the flexible sheet. The handle will cooperate with the frame to allow a user to support the entire weight of the blind while supporting the blind in front of the user's body and concealing the user's body behind the blind.

15 Claims, 2 Drawing Sheets

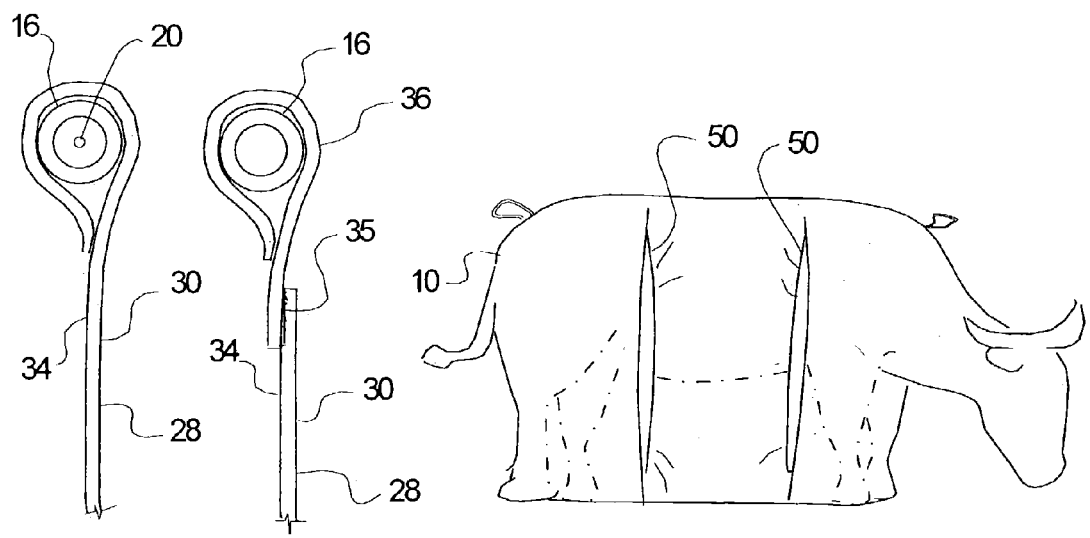
Fig. 3
Fig. 6
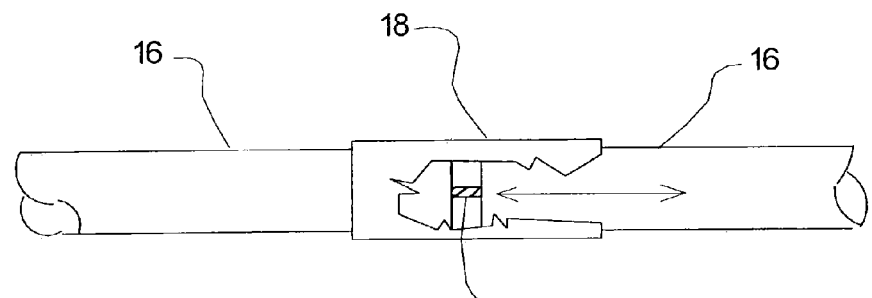
Fig. 4
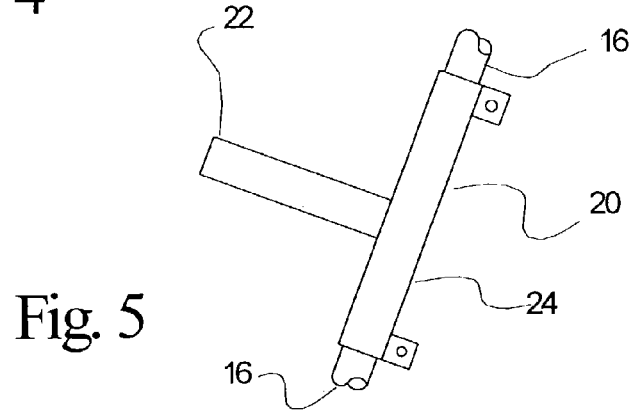
Fig. 5

COLLAPSIBLE BLIND

BACKGROUND OF THE INVENTION (a) Field of the Invention

This invention generally relates to a hunting blind that can be separated into collapsible components for carrying into the field. More particularly, and not by way of limitation, to a collapsible blind having the image of a common non-game animal, such as a cow, that is commonly found amongst game animals.

(b) Discussion of Known Art

The need for a hunting blind that can be easily collapsed and carried into the field in a collapsed manner to allow easy stowage in a rucksack or the like has been identified for quite some time. Additionally, it is known that game animals, such as deer or elk, are not frightened or suspicious of animals such Thus, it would be advantageous to create a collapsible blind that creates the image of an animal, such as a cow, sheep or the like.

However, known approaches at creating a portable blind that is easy to carry into the field and includes the image of an animal have been unsuccessful in that known devices are made from rigid sections that collapse. Examples of known devices include the device shown in U.S. Pat. No. 3,052,054 to Littleton et al., which shows use of sheets of material joined together to create a rigid structure. Another device, illustrated in U.S. Pat. No. 5,765,926 to Manka shows the use of a bench-like structure to support images of cows that conceal a hunter. The images of cows are found on generally rigid panels.

A significant problem associated with the use of rigid-panel construction for a hunting blind is that a hunter must often carry the blind through dense forests, where rigid panels would be difficult and even hazardous to carry. Furthermore, hunters must often hike into the mountains, carrying all of the needed materials for the day's hunt in a rucksack or the like. Therefore, the construction of the blind from a rigid material would frustrate the need to store everything in a backpack that can be carried through the woods.

Still further, there are devices such as the decoy shown in U.S. Pat. No. 5,943,807 to McPherson, which shows the use of looped spring-steel for a "twist-fold" effect that allows rapid deployment of the decoy. This type of device, however, suffers from the limitations imposed by the "twist-fold" structure in that the shape of the blind is restricted by the shape of the "twist-fold" spring. Still further, while the "twist-fold" loops can be compacted, the amount of compaction achievable is limited due to the fact that a spring of sufficient stiffness to support a flat panel of a size that is large enough to conceal an entire human, will be limited as to the minimum size to which it can be compacted.

SUMMARY

It has been discovered that the problems left unanswered by known art can be solved by providing a blind comprising:

A flexible sheet of material, the sheet of material having a first side having an image of an animal such as a domesticated animal, the flexible sheet of material further having a perimeter, at least most of the perimeter being supported by a frame. It is contemplated that the frame will be made from resilient sections that connect to one another and pull most of the flexible sheet of material taut. The blind may further include a handle mounted within the perimeter of the flexible sheet. The handle will cooperate with the frame to allow a user to support the entire weight of the blind while supporting the blind in front of the user's body and concealing the user's body behind the blind.

Thus, it will be understood that the disclosed invention may be carried by the user as a shield, concealing the user's body with a flat panel including the image of a non-game animal, such as a domesticated animal. The example of a cow image on the front of the blind is used as an example because of the large area that can be covered with a life-size imprint or image of a cow. It is preferred that the facade of the blind include the image of a domesticated animal, such as bovine or sheep, due to the fact that wild game animals are accustomed to seeing these animals in the field, and are not afraid of these animals. Furthermore, it is unlikely that people would shoot at a domesticated animal, but it is highly likely that the inclusion of an image of a game animal (as may be found on decoys) will draw fire from other hunters.

Additionally, it is contemplated that the disclosed blind will include attachment points or connectors that will allow the device to be supported from a pair of trees or posts. The resilient sections that form the frame can be separated from one another. Thus, it is contemplated that the sections that form the frame may be of about one foot to about two feet in length in order to facilitate the collapse and packing of the invention. Of course, it is contemplated that sections of other lengths may also be used.

Still further, it is contemplated that the flexible panel used with the blind will be of a woven material that will easily collapse and fold to allow the device to be carried easily in a rucksack or the like. Additionally, the use of a woven fabric will allow some air flow through the device, and thus reduce the resistance force imposed by the device as a result of impinging winds.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 3 illustrates an example of the cooperation between the flexible sheet of material and the components of the frame in supporting the flexible sheet of material.

FIG. 4 illustrates an example of the joint system used with the disclosed invention to form the framework.

FIG. 5 illustrates a connector used to support frame sections at an angle to other frame sections in order to form contours.

FIG. 6 illustrates an example of slotted apertures use with the flexible sheet of material to allow air to flow past the blind, and prevent excessive deformation of the blind from the force of the wind.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
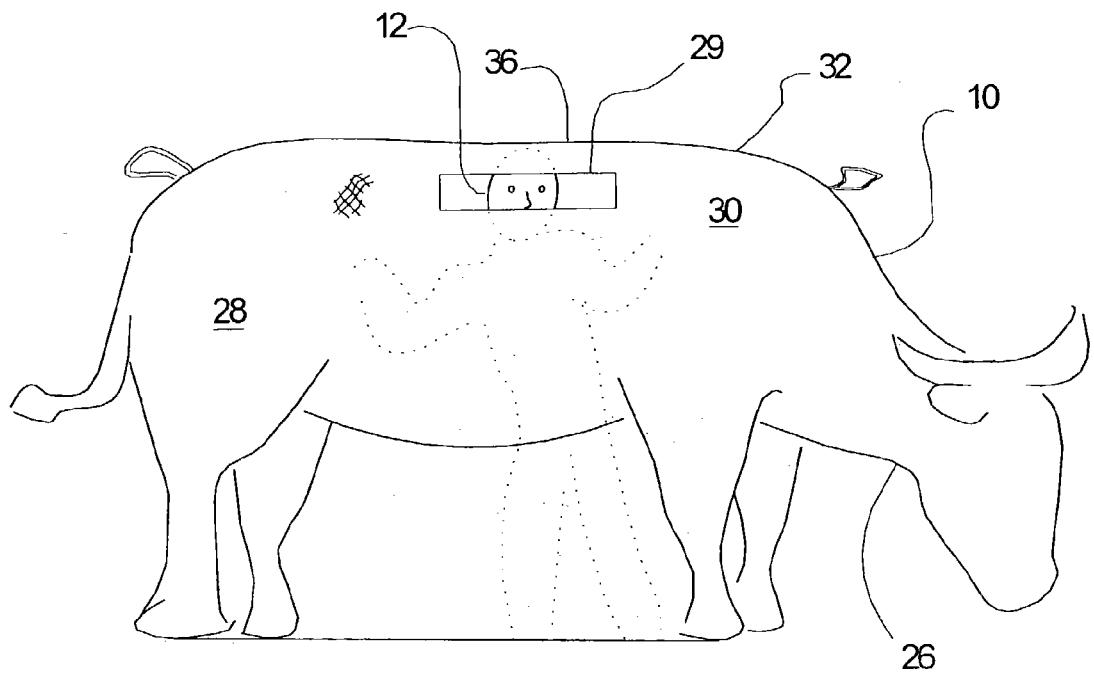
FIG. 1 shows the front of an embodiment of the invention while in use. The view includes a dashed outline of a person hiding behind the blind.

Turning now to FIG. 1 where a concealment device 10 or blind for concealing a person 12 while hunting, taking photographs, or observing wild animals, and particularly game animals. The disclosed concealment device 10 takes advantage of the fact that many game animals share the same pastures or habitat with many domesticated animals, such as bovines, sheep, horses, and the like. Accordingly, the presence of these animals in close proximity to the game animal does not alarm or frighten the game animal. Thus the disclosed invention allows a person to carry a large image of the domestic animal into the field in order to conceal the presence of the person. The movements of person would be perceived as the movements of the animal illustrated on the disclosed concealment device 10.

Figure 2:
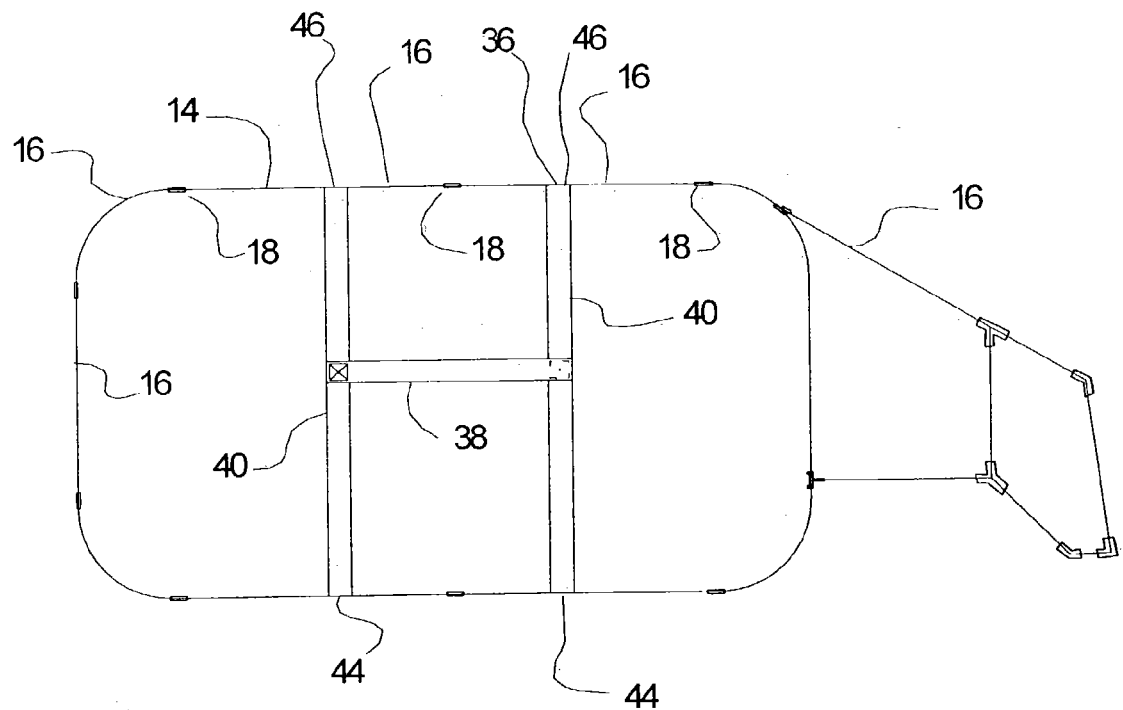
FIG. 2 illustrates an example of the frame for supporting the image on a flexible sheet of material.

As has been illustrated in FIGS. 1 and 2, it is contemplated that the concealing device 10 will include a frame 14 that is made of a resilient material, such as fiberglass, resilient polymers, or other composite materials, although it is contemplated that natural resilient materials such as wood, bamboo, and the like may also be used. In the illustrated example of the invention the frame made of interconnecting sections 16. One example of a connection mechanism that can be used to join or connect the interconnecting section 16 to one another is the use of simple telescoping connector 18, illustrated in FIG. 4. However, it is contemplated that a variety of types of connectors may be used, including threaded sections and the like.

The telescoping connector 18 illustrated in FIG. 4 also shows the use of an elastic retention chord or tether 20. The tether 20 should extend into the interconnecting sections 16 and allow the frame to be separated and collapsed while preserving the sequence or order in which the sections are to be connected to one another.

Additional connectors that may be used with the system include the "T" type connectors, or connectors with female or male receptacles 22 protruding at an angle from the main body 24 of the connector. These additional connectors are used to create protruding sections, such as the section including a neck and head 26, illustrated in FIG. 1.

A significant problem associated with concealment devices such as blinds used for getting close to game animals is that they must be very light weight and collapsible. The requirement of collapsibility and lightweight arise from the fact that these devices must often be carried into the wilderness by the hunter, photographer, or observer under his or her own power. Thus, the device must collapse so that it may be stowed in a backpack or similar carrying device. Accordingly, the disclosed invention includes a flexible sheet of material 28 that can be folded for stowage. The flexible sheet of material 28 may include a window 29 or be made of a material that allows the user to peer through, but does not allow the animal to see the user. These one-way see through fabrics are well known, and many of these types of fabrics or films are discussed in U.S. Pat. No. 6,254,711, which is incorporated herein in its entirety by reference. However, it is also contemplated that the concealing device 10 may include a window 29 that is a simple cut-out or a section made of a movable panel or of a sheer material.

The flexible sheet of material 28 will include a first side 30 having and an image of a domesticated animal 32, and a second side 34, illustrated in FIG. 3. The second side 34 may also include an image of a domesticated animal. For example, the first side 30 may include the image of a bovine, while the second side 34 may include the image of a different domesticated animal, such as the image of a horse or sheep. It is contemplated that the image of the domestic animal 32 will cover most of the first side 30 of the flexible sheet of material 28.

It is important to note that it is also contemplated that one side of the flexible sheet of material 28 may contain an image of a domesticated animal that is commonly found in the habitat of one game animal, and the other side of the flexible sheet of material 28 may contain images of animals commonly found while hunting other types of game animals. For example, it is contemplated that one side may include the image of a bovine, while the other side may contain the image of a large goose. Additionally, it is contemplated that the disclosed system may include interchangeable flexible sheets of material 28, and thus allow the user to carry several scenes into the field, and use a scene that most closely resembles animals and conditions in the area where game animals are found. For example, one scene may include a bovine with a snow background, while another version or side may include a bovine with a wooded or grassy background.

Also shown on FIG. 3 is a system that allows quick detachment of the flexible sheet of material 28 from the frame. The illustrated system includes sections of hook and loop material 35 on the flexible sheet of material 28 to allow mounting of the flexible sheet of material 28 on the frame 14. It is important to note that the hook and loop material may also be attached to the sections of the frame itself, with mating sections or material found on the flexible sheet of material 28.

As illustrated in FIGS. 1 and 2, the flexible sheet of material will also include a perimeter 36. At least most of the perimeter 36 will be supported by the frame 14. As illustrated in FIGS. 2–5, the frame will preferably be made of interconnecting sections, as described above.

Additionally, it is contemplated that a support handle 38 that is supported from the frame 14 will be incorporated into the concealment device 10. It is contemplated that the support handle 38 will be positioned behind the first side 30, or next to the second side 34, of the flexible sheet of material 28, and will allow a person to carry the concealing device 10 by supporting the device from the handle 38. The handle 38 may be connected to a flexible stiffener 40 that extends from one section of the perimeter to another section of the perimeter. As illustrated in FIG. 2, this may include fastening the flexible stiffener 40 directly to the frame 14 at opposing locations 44, 46, on the frame 14. Alternatively, it is contemplated that the flexible stiffener may cooperate directly with the frame 14, to transfer the weight of the concealment device directly to the frame 14. Alternatively, it is contemplated that the flexible stiffener 40 may be attached to the flexible sheet of material 28, which in-turn transfers the weight of the device to the frame 14. It is important to note that it is contemplated that depending on the stiffness of the material used for the flexible sheet of material 28, the flexible stiffener 40 may be omitted. However, because it is desirable to ensure that the flexible sheet of material 28 is as light as possible, it would be advantageous to provide a flexible sheet of material 28 that is made from very light material, and that the forces associated with supporting the device be transferred from the handle 38 directly to the frame 14.

FIG. 6 illustrates the use of slots 50 that allow wind to move through the flexible sheet of material 28, and thus prevent the device from flexing excessively. The slots 50 have been positioned so that their opening under the effects of a wind does not reveal that a person is hiding behind the device.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A concealment device for concealing a person while the device is carried by the person, the concealing device comprising:

A flexible sheet of material, the flexible sheet of material having a first side having an image of a domesticated animal, the image of the domestic animal covering most of the first side of the flexible sheet of material, the flexible sheet of material further having a perimeter, at least most of the perimeter being supported by a frame, the support frame comprising resilient sections with telescoping connectors; and A support handle, the handle being supported from the frame and being positioned behind the first side of the flexible sheet of material, so that the person can carry the concealing device by supporting the device from the handle to conceal the person while the person holds the concealing device.

2. A concealing device according to claim 1 wherein said telescoping connectors include an elastic tether.

3. A concealing device according to claim 1 wherein said handle is connected to a stiffener that extends from about the perimeter.

4. A concealing device according to claim 3 wherein said stiffener comprises a section of webbing.

5. A concealing device according to claim 4 and further comprising at least one loop mounted from the perimeter, the loop being adapted for supporting the concealing device from an external support.

6. A concealment device for concealing a person while the device is carried by the person, the concealing device comprising:

a frame, the frame forming a closed loop and being formed from interconnecting sections, the interconnecting sections include telescoping connectors;

A flexible sheet of material, the flexible sheet of material having a first side having an image covering most of the first side of the flexible sheet of material, the flexible sheet of material further having a perimeter, at least most of the perimeter being supported by the frame; and A support handle, the handle being supported from the frame and being positioned behind the first side of the flexible sheet of material, so that the person can carry the concealing device by supporting the device from the handle to conceal the person while the person holds the concealing device.

7. A concealing device according to claim 6 wherein said telescoping connectors include an elastic tether.

8. A concealing device according to claim 6 wherein said handle is connected to a flexible stiffener that extends from one section of the perimeter to another section of the perimeter.

9. A concealing device according to claim 8 wherein said stiffener comprises a section of webbing.

10. A concealing device according to claim 9 and further comprising at least one loop mounted from the perimeter, the loop being adapted for supporting the concealing device from an external support.

11. A method for concealing a person while hunting a game animal, the method comprising:

providing flexible sheet of material, the flexible sheet of material having a first side having an image of a domesticated animal, the image of the domesticated animal being selected from the group consisting essentially of livestock, the image of the domestic animal covering most of the first side of the flexible sheet of material the flexible sheet of material further having a perimeter;

supporting at least most of the perimeter from a frame, the frame forming a closed loop and being formed from interconnecting sections, the interconnecting sections being joined through telescoping connectors; and a support handle, the handle being supported from the frame and being positioned behind the first side of the flexible sheet of material;

supporting the concealment device between the person and the game animal, so that the game animal perceives the game animal, and so that the person can carry the concealing device by supporting the device from the handle to conceal the person while the person holds the concealing device.

12. A method according to claim 11 wherein said telescoping connectors include an elastic tether.

13. A method according to claim 11 wherein said handle is connected to a stiffener that extends from about the perimeter.

14. A method according to claim 13 wherein said stiffener comprises a section of webbing.

15. A method according to claim 14 and further comprising at least one loop mounted from the perimeter, the loop being adapted for supporting the concealing device from an external support.

* * * * *